US010257819B2

(12) United States Patent
Jalkanen et al.

(10) Patent No.: US 10,257,819 B2
(45) Date of Patent: Apr. 9, 2019

(54) ASSIGNMENT OF NETWORK RESOURCE TO A DEVICE (71) Applicant: Telia Company AB, Stockholm (SE)

(72) Inventors: Tero Jalkanen, Tuusula (FI); Tomi Sarajisto, Helsinki (FI)

(73) Assignee: TELIA COMPANY AB, Stockholm (SE)

( * ) Notice: Subject to any disclaimer, the term of this patent is extended or adjusted under 35 U.S.C. 154(b) by 129 days.

(21) Appl. No.: 15/422,952

(22) Filed: Feb. 2, 2017

(65) Prior Publication Data
US 2017/0223678 A1 Aug. 3, 2017

(30) Foreign Application Priority Data
Feb. 2, 2016 (FI) ...................................... 20165072

(51) Int. Cl.
H04W 72/04 (2009.01)
H04W 76/11 (2018.01)
G06Q 20/14 (2012.01)
H04W 28/18 (2009.01)
H04W 88/04 (2009.01)

(52) U.S. Cl.
CPC ......... H04W 72/042 (2013.01); H04W 28/18 (2013.01); H04W 72/04 (2013.01); H04W 72/0486 (2013.01); H04W 88/04 (2013.01)

(58) Field of Classification Search
CPC ... H04W 72/042; H04W 72/04; H04W 28/18; H04W 72/0486; H04W 88/04
See application file for complete search history.

(56) References Cited

U.S. PATENT DOCUMENTS

| 6,532,368 B1 | 3/2003 | Hild et al. |
| 2002/0071416 A1 | 6/2002 | Carlson et al. |
| 2009/0040937 A1 | 2/2009 | Xhafa et al. |
| 2013/0107738 A1* | 5/2013 | Cherian ............... H04W 76/11 370/252 |
| 2014/0250229 A1 | 9/2014 | Prokopenko et al. |
| 2015/0148104 A1* | 5/2015 | Friedl .................. G06Q 20/145 455/561 |

FOREIGN PATENT DOCUMENTS

EP 1 993 231 A1 11/2008

OTHER PUBLICATIONS

European Search Report issued in Application No. EP 17 15 4332, dated Jun. 23, 2017.

* cited by examiner

Primary Examiner — Kiet Tang
(74) Attorney, Agent, or Firm — Young & Thompson (57) ABSTRACT The invention relates to a method for assigning a capacity of a network resource to a device (150) through a negotiating network terminal (110). The method comprises: detecting (210) available network resource, obtaining (220) at least one parameter value from the available network resource, comparing (230) the obtained parameter value to at least one comparison value, in response to the comparison selecting (240) the available network resource if the obtained parameter value meets best the at least one comparison value. The method further comprising: delivering (260) a signal indicating an availability of a capacity of the selected network resource on a condition and assigning (270) the capacity to the device in response to a receipt of an acknowledgement signal indicating that the device accepts the condition. The invention also relates to a terminal and to a computer program product.

14 Claims, 4 Drawing Sheets

ASSIGNMENT OF NETWORK RESOURCE TO A DEVICE

TECHNICAL FIELD

The invention concerns in general the technical field of network resource management. More particularly, the invention concerns assignment of network resource to a device.

BACKGROUND

Mobile terminals are nowadays capable of utilizing network resources based on different network technologies. The utilization of network resources provides the terminal a communication channel for transferring and receiving data to and from the network.

It is also known that a mobile terminal may be set to operate as a base station for other mobile terminals. Typically, such a situation is that the mobile terminal is connected to a mobile communications network through one network technology. Additionally, a short range communication is enabled in the mobile terminal and the mobile terminal is set on a state that it operates as a base station establishing a short range communication network, such as Wi-Fi network, in the area where the mobile terminal resides. Now, one or more other terminals may be connected to the short range communication network provided by the mobile terminal and in such manner the other terminals may access to a data network though the mobile terminal is being connected to the mobile communication network.

One drawback of the prior art solutions is that the provision of network resources by the mobile terminal is static in nature. This refers to the fact that the terminal may only provide the network resources to the network into which it is connected to. Furthermore, the prior art solutions only enable the provision of the network resources free-of-charge, or at least in a manner, that the provider, i.e. the mobile terminal operating as base station, does not get any compensation on the provision.

Hence, there is need to introduce solutions that mitigate at least some of the above described drawbacks at least partly.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a terminal and a computer program product for assigning at least some capacity of a network resource to a device. Another objective of the invention is that the method, the terminal and the computer program product enable negotiation of the assignment of the network resource between different entities being involved in the method.

The objectives of the invention are reached by a method, a terminal and a computer program product as defined by the respective independent claims.

According to a first aspect, a method for assigning at least part of a capacity of a network resource to a device through a negotiating network terminal is provided, wherein the method comprises: detecting at least one available network resource, obtaining at least one parameter value from the at least one available network resource wherein the at least one parameter value represents a characteristics of the network resource in question, comparing the obtained at least one parameter value of each of the at least one available network resource to at least one comparison value, in response to the comparison selecting the at least one available network resource whose the obtained at least one parameter value meets best the at least one comparison value; and wherein the method further comprises: delivering a signal indicating an availability of a capacity of the selected network resource on at least one condition, assigning at least part of the capacity of the selected at least one network resource to the device in response to a receipt of an acknowledgement signal indicating that the device accepts the at least one condition.

The detection may be based on recognition of a broadcast network identifier.

The obtaining of the at least one parameter value may be performed by attaching to the network resource in question. The network resource to be attached may at least partly be selected on basis of a network preference list stored in a subscriber identity module accessible by the negotiating network terminal.

The delivery of the signal indicating the availability of the capacity of the selected at least one network resource may be performed by at least one of the following: broadcast, in response to a request by the device. The delivery of the at least one condition, in turn, may be performed by one of the following: embedding the at least one condition in the broadcast signal, delivering in response to a request by the device.

Further, the acknowledgement signal indicating that the device accepts the predetermined condition may be received from at least one of the following: the device, a third party node.

The at least one condition of the network resource relates to at least one of the following: bandwidth, latency, amount of transferable data, price, security aspect, protocol version.

According to a second aspect, a negotiating network terminal is provided, the negotiating network terminal comprising at least one processor and at least one memory including computer program code, and the at least one memory and the computer program code configured to, with the at least one processor, cause the negotiating network terminal at least to perform: detect at least one available network resource, obtain at least one parameter value from the at least one available net-work resource wherein the at least one parameter value represents a characteristics of the network resource in question, compare the obtained at least one parameter value of each of the at least one available network resource to at least one comparison value, in response to the comparison select the at least one available network resource whose the obtained at least one parameter value meets best the at least one comparison value; and wherein the negotiating network terminal is further caused to perform: deliver a signal indicating an availability of a capacity of the selected network resource on at least one condition, assign at least part of the capacity of the selected at least one network resource to the device in response to a receipt of an acknowledgement signal indicating that the device accepts the at least one condition.

Further, the negotiating network terminal may be configured to perform the detection on basis of recognition of a broadcast network identifier.

The negotiating network terminal may be configured to perform the obtaining of the at least one parameter value by attaching to the network resource in question. The negotiating network terminal may be configured to perform the selection of the network resource to be attached at least partly on basis of a network preference list stored in a subscriber identity module accessible by the negotiating network terminal.

The negotiating network terminal may be configured to perform the delivery of the signal indicating the availability of the capacity of the selected at least one network resource by at least one of the following: broadcast, in response to a request by the device.

The negotiating network terminal may be configured to perform the delivery of the at least one condition by one of the following: embedding the at least one condition in the broadcast signal, delivering in response to a request by the device.

Alternatively or in addition, the negotiating network terminal may be configured to receive the acknowledgement signal indicating that the device accepts the predetermined condition from at least one of the following: the device, a third party node.

According to a third aspect, a computer program product comprising program instructions which when executed by a negotiating network terminal cause the negotiating network terminal to perform the method as described above in the context of the first aspect.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an example of an environment in which the present invention may be implemented to.

FIG. 4 illustrates schematically another example of an environment in which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
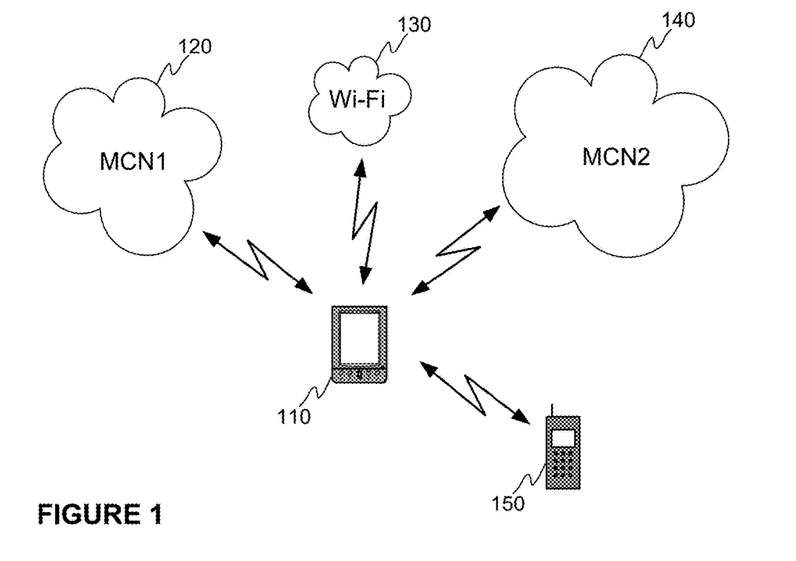

FIG. 1 illustrates schematically an example of an environment in which the present invention may be implemented to. A transceiver terminal called a negotiating network terminal 110 resides in an area where one or more network resources are available for use. The negotiating network terminal 110 is configured, and equipped with necessary means, to monitor and detect the network resource, or resources, in the area it resides. In the example as illustrated in FIG. 1 there are two mobile communication networks 120, 140 (MCN—Mobile Communication Network) and one short range wireless network (here Wi-Fi) 130 available for the negotiating network terminal 110. In order to detect the available network resources the negotiating network terminal 110 may be configured to monitor one or more radio channels in order to detect networks, e.g. with network identifiers. In other words, as it comes to mobile communication networks the negotiating network terminal 110 may be configured to detect mobile communication networks by recognizing the network identifiers broadcast within the area. In response to the detection the negotiating network terminal 110 may be configured to select at least one mobile communication network to be attached. The selection may e.g. be based on a so called network preference list that is stored in a memory of a SIM (Subscriber Identity Module) residing in the negotiating network terminal 110. The preference list may, but is not limited to, define one or more mobile communication networks into which the negotiating network terminal equipped with SIM may or may not attach. Moreover, one or more further criterion may be set for selecting the mobile communication network, such as the negotiating network terminal shall primarily attempt to attach to a network providing the highest signal strength to the negotiating network terminal 110. In some embodiment the negotiating network terminal 110 may be configured to select more than one mobile communication network to be attached to, especially if the terminal comprises a plurality of radio parts. The attachment may then be concurrent to a plurality of networks. As it comes to Wi-Fi, or other short-range communication networks, the negotiating network terminal 110 may be configured to attach to the network in question. The attachment may be possible if the Wi-Fi network is accessible without any credentials or if the terminal, or the user of the terminal, is aware of the required credentials to the network. The attachment shall primary in this context be understood as a mechanism to obtain information from the one or more networks for purposes as will be described. This may require an attachment to one or more mobile communication network as defined in corresponding specifications as well as an attachment to one or more short-range communication network e.g. through an access right procedure. The present invention is applicable with any network type, for example Sigfox, LoRa or any other long-range network may be provided for attachment in addition or alternatively to Wi-Fi, for example.

In response to the detection and an attachment the negotiating network terminal 110 may initiate a negotiation towards at least one of the detected networks 120, 130, 140. The negotiation may comprise, but is not limited to, obtaining with a query at least one parameter value from the network resource, or network resources. The at least one parameter value advantageously represents at least one characteristics of the network resource in question. Some examples of the at least one characteristics may be, but is not limited to, bandwidth, latency, amount of transferable data, price, security aspects, protocol versions in use or any combination of the characteristics. The combination covers also any derivation of at least two characteristics, such as price per predetermined amount of transferred data, for instance. As may be seen above the negotiation primarily relates to a utilization of the network resource in question for data connection. As the negotiating network terminal 110 is configured to obtain the at least one parameter value from the at least one available network resource the parameter value shall be utilized for a selection of the network resource to be utilized. In order to make the selection the negotiating network terminal 110 may be configured to compare the obtained parameter value received from one or more network resources to one or more comparison value. The at least one comparison value is arranged accessible to the negotiating network terminal 110. For example, it may be stored in a memory of the negotiating network terminal 110 or be obtainable from a network node, such as a server, into which the negotiating network terminal 110 has access either directly or indirectly. The comparison value may be fixed or changing dynamically through a predefined scheme. According to an embodiment of the invention the one or more comparison values may be defined by a user and, thus, representing a user preference. For example, the user may define that he/she requires a service that has a certain parameter value and sets that as the comparison value. For example, a price for a certain service that is acceptable to the user in question may be set as the comparison value by the user. An outcome of the comparison may be that the negotiating network terminal selects at least one available network resource for further use, as will be described. For example, the selected network resource may be the network resource whose the at least one parameter value meets best the at least one comparison value, i.e. fulfills the user preference. As a result, the negotiating network terminal 110 is aware of an optimal network resource to be used if necessary. In some further embodiment of the invention the negotiating network terminal 110 may be configured to generate a signal to the selected network resource, i.e. to a network node, which signal indicates that the negotiating network terminal 110 may utilize the selected network resource at some point of time. The signal may also indicate that the negotiating network terminal 110 is willing to reserve an amount of communication capacity from the network resource in question.

The negotiation, as described above, may be a part of the attachment to the network in question. Alternatively or in addition, the negotiation may be arranged to be performed in response to the attachment to the one or more networks. For example, the negotiating network terminal 110 may comprise an installed application software that, when executed, is configured to signal a request of parameter value or values to a network element. The network element may be configured to response by providing one or more pre-agreed parameter values to the negotiating network terminal. The negotiation may be performed with one or more networks that the negotiating network terminal has detected and been attached to.

Further, in response to the negotiation and the selection of the network resource the negotiating network terminal 110 may be configured to, according to an embodiment of the invention, advertise an availability of the selected network resource or resources. The advertisement of network resource availability may e.g. be implemented with a short-range communication technology, such as with Bluetooth. For example, in response to the negotiation and the selection of a network resource possibly to be utilized the negotiating network terminal 110 may be configured to broadcast an advertisement signal indicating that it may provide network resources to third parties. Naturally, prior to the advertisement the negotiating network terminal 110 may have switched on the radio part providing the communication technology, such as Bluetooth, for the advertisement either automatically instructed by an internal application or in response to a manual instruction provided e.g. by the user of the negotiating network terminal 110. As a result, the negotiating network terminal 110 operates as a broadcaster of the network resource availability within the area defined by the radio technology used for the advertising.

Some aspects of the invention relate to the advertisement signal. The signal may advantageously be structured so that it comprises information, such as an indicator, on that it is an advertisement signal of available network resources. The advertisement signal may also comprise information on a condition on which the network resource or resources is available for use through the negotiating network terminal 110. The information on the condition may be embedded, for example, in a header field, or fields, of the advertisement message, which information may be read by a device 150 receiving the advertisement signal, and e.g. shown to the user of the device.

As a result of the advertisement the negotiating network terminal 110 may receive a request from a device 150 to utilize the advertised network resource or resources.

Alternatively, the negotiating network terminal 110 may directly receive a request, or at least an indication, from a device 150 that the device 150 needs at least one network resource to be used via the negotiating network terminal 110. The negotiating network terminal 110 may be configured to deliver a signal to the device 150 which signal indicates an availability of a capacity of the selected network resource on a predetermined condition. In this embodiment of the invention the device 150 may be configured to broadcast network resource request message through a communication channel that may be listened by at least one negotiating network terminal 110. Again, the communication channel may be implemented with a short-range communication technology, such as Bluetooth, for example.

Next some aspects of the predetermined condition defined and provided by the negotiating network terminal 110 are given. The predetermined condition provided to the device 150 by the negotiating network terminal 110 may e.g. relate, but is not limited to, to bandwidth, latency, amount of transferable data, price, operator, communication technology or any combination of the characteristics as mentioned. An example of the condition may be that the condition indicates that the negotiating network terminal 110 may provide to the device 150 a network capacity X Mbit/s with a price of Y euros/Z minutes. In other words, the negotiating network terminal 110 may assign at least part of the capacity of the selected network resource to the device 150 if the device 150 accepts the predetermined condition. Hence, in response to an acknowledgement of the acceptance of the condition from the device 150 the negotiating network terminal 110 may assign a capacity of the network resource to the device 150. The assignment may request signaling with the selected network resource in order to connect the negotiating network terminal 110 to the network resource in question. As a result, the negotiating network terminal 110 is arranged to operate as a router between the device 150 and the selected network resource.

The negotiating network terminal 110 may operate as a router over the same short-range communication technology over which the negotiation is performed or alternatively it may be configured to initiate base station functionality over another communication technology, such as Wi-Fi, and allow the device 150 to connect to it over the Wi-Fi.

Furthermore, in some implementation of the invention the negotiating network terminal 110 may comprise better mobile network connection quality e.g. due to better hardware, such as antenna, than the device 150. In such a situation the described negotiation/advertisement procedure may also be applied causing the device 150 to use mobile communication network services at least partly through the negotiating network terminal 110. For example, LTE device-to-device (D2D) communication arrangement may be applied herein in which the negotiating network terminal 110 and the device 150 are mutually connected over D2D connection that utilizes network resources, such as time-frequency allocation, of the LTE mobile communication network, but wherein the negotiating network terminal performs the communication towards the base station, i.e. eNodeB, on behalf of the device 150. In other words, the negotiating network terminal 110 performs LTE-to-LTE gateway operation.

For sake of clarity, the device 150 may be a mobile terminal that is capable of establishing a connection, such as a short range connection or any other as described above, to and with the negotiating network terminal 110.

The present invention does not take any standpoint, nor limit it, as it comes to a possible mechanism in which the device 150 compensates the negotiating network terminal 110 of the assignment of network resources. As an example, the transaction may be performed through a payment service into which both the negotiating network terminal and the device have access. The payment service may e.g. be a bitcoin system or PayPal, for instance. Furthermore, any block-chain type distributed solution may be applied as a compensation mechanism wherein the devices 110, 150 are configured to automatically exchange information between the seller and the buyer. The block-chain type solution may comprise, but is not limited to, steps of identifying the parties involved in the interaction and agreeing the compensation on the offered services. A database may be configured to collect the generated information i.e. the transactions.

The compensation does not necessarily refer to monetary compensation but may also cover any other type of compensation. For example, the compensation may be provided by a third party, such as from a telecom operator whose network node is involved in the assignment of network resources. In such a case the third party may motivate the seller to provide the network resource by introducing such compensation means that attract users of the negotiating network terminals to operate as sellers. For example, if the third party is a telecom operator it may use vouchers of their services, such as voice call service, as compensation means.

Figure 2:
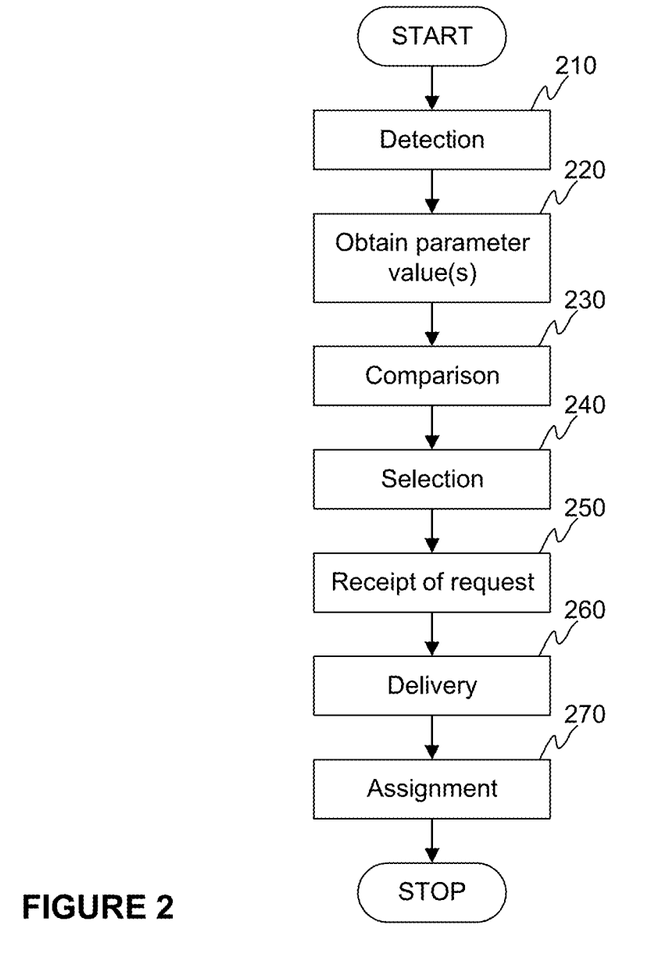
FIG. 2 illustrates schematically a method according to an embodiment of the invention.

FIG. 2 schematically illustrates a method according to an embodiment of the invention. The method as illustrated comprises steps as follows:

210: detecting at least one available network resource in the area where the negotiating network terminal resides;

220: obtaining at least one parameter value from the at least one available network resource wherein the at least one parameter value represents a characteristics of the network resource in question;

230: comparing the obtained at least one parameter value of each of the at least one available network resource to at least one comparison value;

240: selecting, in response to the comparison, the at least one available network resource whose the obtained at least one parameter value meets best the at least one comparison value;

250: receiving a request of a network resource from the device;

260: delivering a signal indicating an availability of a capacity of the selected network resource on a predetermined condition;

270: assigning at least part of the capacity of the selected network resource to the device in response to a receipt of an acknowledgement signal indicating that the device accepts the predetermined condition.

As discussed, prior to the receipt of the request in step 250 the negotiating network terminal 110, or even the device 150, may be configured to advertise either the availability of the network resource or a need of network resource, correspondingly. The advertisement signaling may comprise information on a condition to use a radio resource thought the negotiating network terminal 110. In such case, there is no need to deliver the condition information in step 260.

Figure 3:
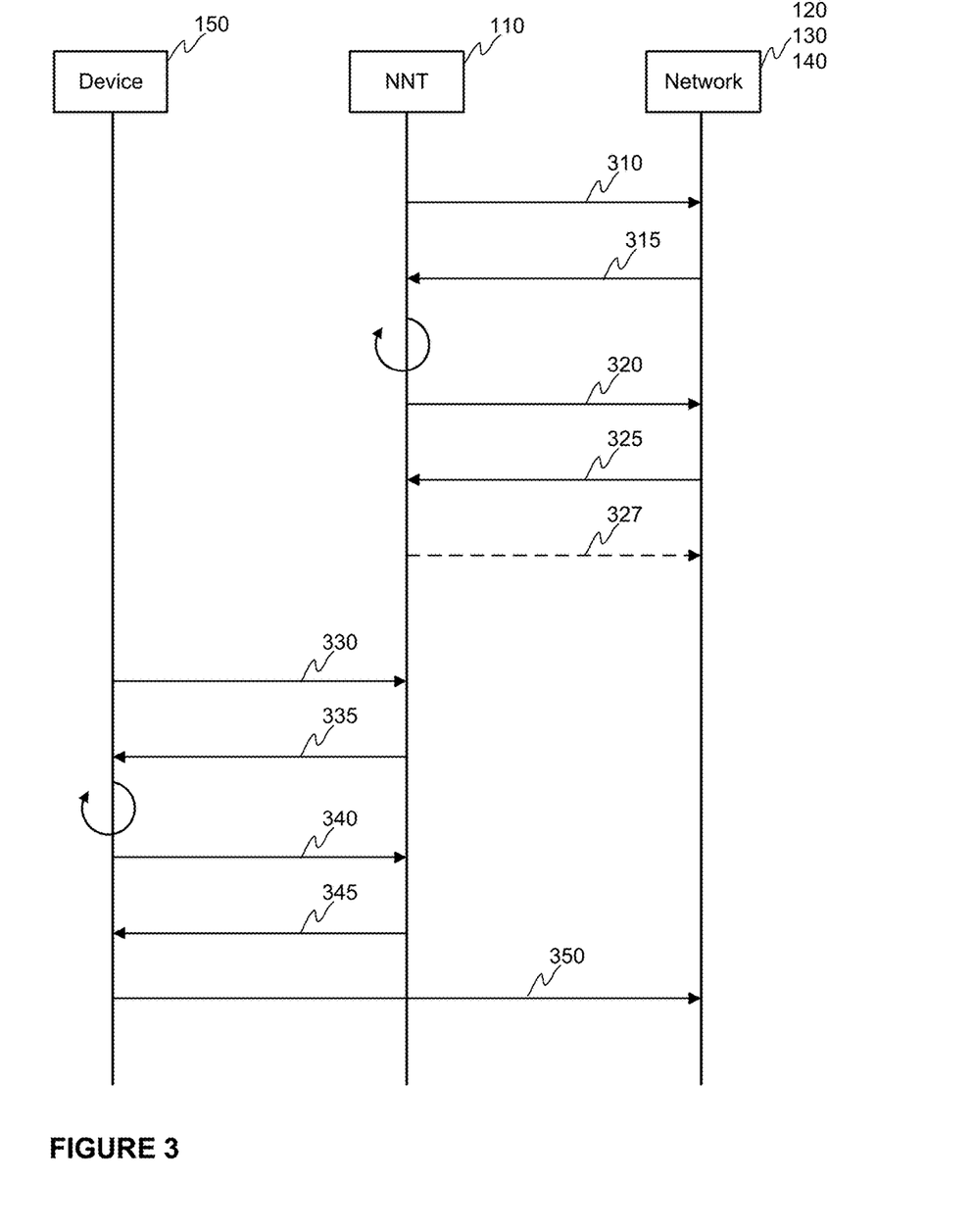
FIG. 3 illustrates schematically an embodiment of the present invention as a signal diagram.

FIG. 3 schematically illustrates an embodiment of the present invention as a signal diagram. The FIG. 3 illustrates the signaling after the negotiating network terminal 110 has detected one or more communication networks 120, 130, 140, i.e. network resources, and possibly attached to at least one of them. Next, the negotiating network terminal 110 is configured to send a query 310 to one or more networks 120, 130, 140 in order to obtain more or more parameter values. As said the parameter values may advantageously represent at least one characteristics of the network resource in question. The query is sent to an applicable network element that is able to provide the parameter value. For example, the network element may be, but is not limited to, a base station, a base station controller, a register in the network, a network management node (e.g. MME), a server accessible over the network or a combination of these. In response to the query the network provides the requested information 315. The negotiating network terminal 110 may perform query-response procedure with all the detected networks (shown as circle arrow in FIG. 3). As already described, the negotiating network terminal 110 may compare the obtained parameter value with corresponding comparison value and in response to the comparison phase the negotiating network terminal 110 may be configured to select at least one network resource. The negotiating network terminal 110 may be configured to indicate the selection 320 to the network. In response to the indication the network may send an acknowledgment 325 to the indication and possibly the negotiating network terminal 110 may access to the network in question. The selection may also comprise a procedure to reserve network resources with certain characteristics, such as with certain price and bandwidth.

Next, the negotiating network terminal 110 may or may not advertise availability of the network access in the manner as described. At some point the negotiating network terminal 110 may receive a query 330 from a device 150 regarding utilization of the selected network resource. In the example as shown in FIG. 3 the negotiating network terminal 110 is configured to provide an offer i.e. inform the device 150 on at least one condition set for the use of the selected network resource 335 through the negotiating network terminal 110. The device 150 may request a new offer from the negotiating network terminal 110, or from any other negotiating network terminal accessible by the device 150 (shown as circle arrow in FIG. 3). In response to one or more offers the device 150 may select at least one of the offered network resources and signal the acceptance of the at least conditions 340 set for the utilization of the network resource to the negotiating network terminal 110. The negotiating network terminal 110 may, in response to the acceptance, acknowledge 345 the selection to the device 150. The acknowledgement may also comprise some further information, such as instructions or invitation, to access the offered network resources. The instruction and/or the invitation may e.g. comprise a link to access to an application residing in the negotiating network terminal 110 for initiating router functionality in the negotiating network terminal 110. Finally, the device 150 may access to network resources provided by the selected network 120, 130, 140 through the negotiating network terminal 110.

The procedure as depicted with signals 320, 325 and 327 in FIG. 3 are not necessary to be performed in the described phase. Namely, as the negotiating network terminal 110 has received the at least one parameter value from the one or more networks 120, 130, 140 that parameter value is acceptable, it may start advertising availability of the network resources through it without informing the selection to the network resource(s) in question or without establishing the access to the selected network. In such an implementation the final agreement on the selection and the utilization of the network resources may be performed in response to an acceptance of an offer by at least one device 150. This kind of implementation may reduce signaling in the preparation phase.

It is also worthwhile to mention that in case the negotiating network terminal 110 comprises means, such as multiple radio parts, for accessing multiple radio networks concurrently the negotiating network terminal 110 may provide multiple conditions for acceptance to the device 150. Then, the device 150 may return, as a response, an indication on the condition that is acceptable in order to provide the negotiating network terminal 110 information on the network resource to be provided for the device 150. In this manner it is possible to offer the device 150 several network resources.

Figure 4:
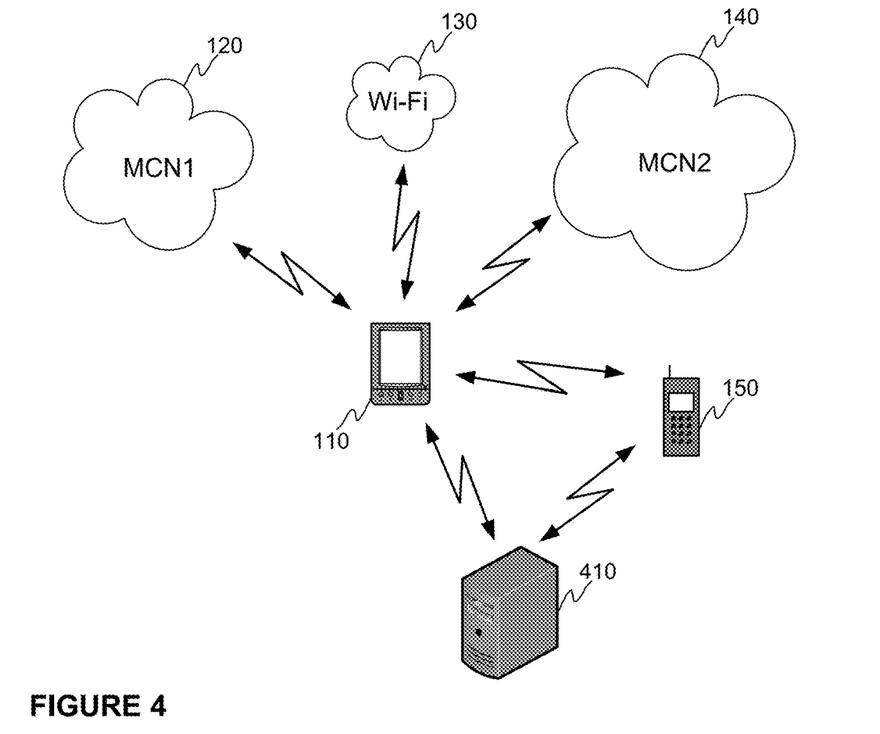

The invention is above described mainly so that the device 150 may start utilizing the selected network resources in response to an acceptance of the at least one condition and acknowledging the acceptance to the negotiating network terminal 110. According to another embodiment of the invention, as schematically illustrated in FIG. 4, the acceptance of the at least one condition by the device 150 may require support from a third party node that is illustrated as a server 410 in FIG. 4. More specifically, when the negotiating network terminal 110 provides the at least one condition to the device 150 through advertisement message or in response to a request from the device 150, the acceptance of the at least one condition may cause the device to establish a connection, e.g. a data connection or through messaging, to a third party, such as to a server 410. The establishment of the connection may be configured to happen automatically when the device 150 indicates the acceptance of the condition in response to a user action or automatically. For example, if the condition requires a transaction to be happened between the parties the server 410 may represent a financial institution that is involved in the method for taking care of the transaction itself. A non-limiting example of the transaction may be that the server receives the indication of the acceptance of the condition and at the same time information on the amount of money as well as the receiver of the transaction. In response to the acceptance the server is configured to transfer the amount of money from an account of the device user to an account of the negotiating network terminal user. In response to the successful transaction the server 410 may be configured to deliver an acknowledgement indication the successful transaction at least to the negotiating network terminal 110, but preferably also to the device 150. In response to the acknowledgement from the server 410 the negotiating network terminal 110 may indicate an assignment of network resources to the device 150 and the device 150 may start utilizing the assigned network resources through the negotiating network terminal 110 operating as a router to the network resource. The description above provides one example of an embodiment of the invention in which a third party is involved in the provision of the network resources to a device 150 by a negotiating network terminal 110. In some further embodiment the server 410 may not necessarily directly inform the negotiating network terminal 110 on the successful transaction, but the server 410 may deliver a confirmation of the transaction e.g. with details back to the device 150 that is configured to deliver the confirmation further to the negotiating network terminal 110 e.g. together with the indication that it accepts the predetermined condition. When the negotiating network terminal 110 receives the indication the negotiating network terminal 110 may assign the network resource to the device 150.

Figure 5:
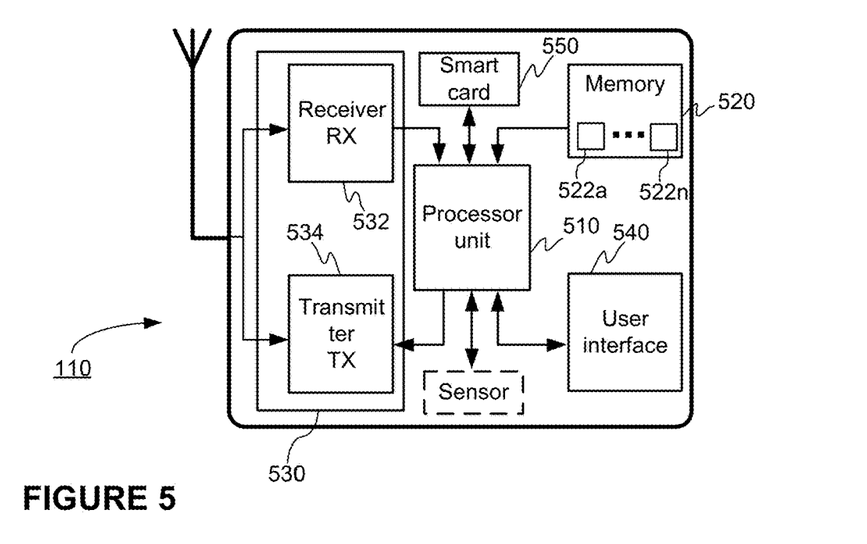
FIG. 5 illustrates schematically an example of a negotiating network terminal.

FIG. 5 schematically illustrates an example of a negotiating network terminal 110 that may be configured to operate as a core element for providing network resources to a device 150 in the manner as described. The negotiating network terminal 110 may comprise a processor unit 510 comprising one or more processors, a memory unit 520 comprising one or more memory elements, a transceiver unit 530 comprising one or more receivers 532 and transmitters 534 configured to implement one or more communication technologies as well as one or more antennas. Further, the negotiating network terminal 110 may comprise a user interface by means of which it is possible to input and output information with a user. The user interface may comprise, but is not limited to, at least one of the following: a display, a touch screen, one or more buttons, one or more microphones, one or more loudspeakers and so on. The negotiating network terminal 110 may further be equipped with a smart card 550 that in the context of the present invention may refer to a subscriber identity module (SIM). The SIM may be implemented either with a physical smart card or as a logic stored in the memory to be executed with the processor, for example. Moreover, the negotiating network terminal 110 may comprise one or more sensors for different purposes.

The memory 520 of the negotiating network terminal 110 may store one or more portions of computer program code 522a-522n. The portions may refer to modules of code which, when executed by the processor unit 510, causes the negotiating network terminal 110 to operate in the manner as described. For example, one module may define instructions to detect, to obtain the parameter values, to perform the comparison and to select one or more network resources. Another module, in turn, may define instructions to advertise, to receive a request, to deliver a condition and to assign the network resource. The modules may be part of an executable application that, as a whole, causes the negotiating network terminal to operate in the described manner.

Some non-limiting examples of the negotiating network terminal are a mobile phone, a tablet computer, a laptop computer, a modem, a transceiver circuitry. The device in question may be equipped with subscriber identity module if such is needed for accessing to a network resource, such as a mobile communication network.

Some aspects of the invention relate to a computer program product comprising program instructions which when executed by a negotiating network terminal cause the negotiating network terminal to perform the method as described above. The computer program product may be implemented with any applicable computer program language and the computer program product may be stored in the terminal, or transferred from another non-transitory readable medium to the terminal. Furthermore, the device 150 may also comprise portions of computer program product to cause the device 150, when the portions of the computer program product are executed, to operate as described.

The device 150 may comprise the corresponding units as the negotiating network terminal 110. At least the device 150 shall comprises a transceiver unit for coupling communicatively to the negotiating network terminal 110 and a processor unit and a memory storing portions of computer program code that comprise instructions to cause the device to operate as described when the portions of the computer program code are executed by the processor.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for assigning at least part of a capacity of a network resource to a device through a negotiating network terminal, the method comprising:
   detecting at least one available network resource;
   obtaining at least one parameter value from the at least one available network resource, the at least one parameter value representing at least one characteristic of the network resource;
   comparing the obtained at least one parameter value of each of the at least one available network resource to at least one comparison value;
   in response to the comparison, selecting the at least one available network resource whose obtained at least one parameter value best meets the at least one comparison value;
   delivering a signal indicating an availability of a capacity of the selected network resource on at least one condition; and
   assigning at least part of the capacity of the selected at least one network resource to the device in response to a receipt of an acknowledgement signal indicating that the device accepts the at least one condition,
   wherein the obtaining of the at least one parameter value is performed by attaching to the network resource, and
   the network resource to be attached is at least partly selected based on a network preference list stored in a subscriber identity module accessible by the negotiating network terminal.

2. The method of claim 1, wherein the detection is based on recognition of a broadcast network identifier.

3. The method of claim 1, wherein the delivery of the signal indicating the availability of the capacity of the selected at least one network resource is performed by at least one of the following: broadcast, and in response to a request by the device.

4. The method of claim 3, wherein the delivery of the at least one condition is performed by one of the following: embedding the at least one condition in the broadcast signal, and delivering in response to a request by the device.

5. The method of claim 1, wherein the acknowledgement signal indicating that the device accepts the predetermined condition is received from at least one of the following: the device, and a third party node.

6. The method of claim 1, wherein the at least one condition of the network resource relates to at least one of the following: bandwidth, latency, an amount of transferable data, price, a security aspect, and a protocol version.

7. The method of claim 2, wherein the at least one condition of the network resource relates to at least one of the following: bandwidth, latency, an amount of transferable data, price, a security aspect, and a protocol version.

8. The method of claim 3, wherein the at least one condition of the network resource relates to at least one of the following: bandwidth, latency, an amount of transferable data, price, a security aspect, and a protocol version.

9. A negotiating network terminal comprising:
   at least one processor;
   and at least one memory including computer program code,
   the at least one memory and the computer program code configured to, with the at least one processor, cause the negotiating network terminal at least to:
   detect at least one available network resource,
   obtain at least one parameter value from the at least one available network resource wherein the at least one parameter value represents a characteristics of the network resource in question,
   compare the obtained at least one parameter value of each of the at least one available network resource to at least one comparison value,
   in response to the comparison, select the at least one available network resource whose the obtained at least one parameter value meets best the at least one comparison value,
   deliver a signal indicating an availability of a capacity of the selected network resource on at least one condition, and
   assign at least part of the capacity of the selected at least one network resource to the device in response to a receipt of an acknowledgement signal indicating that the device accepts the at least one condition,
   wherein the obtaining the at least one parameter value is performed by attaching to the network resource, and
   the network resource to be attached is at least partly selected based on a network preference list stored in a subscriber identity module accessible by the negotiating network terminal.

10. The negotiating network terminal of claim 9, wherein the negotiating network terminal is configured to perform the detection based on recognition of a broadcast network identifier.

11. The negotiating network terminal of claim 9, wherein the negotiating network terminal is configured to perform the delivery of the signal indicating the availability of the capacity of the selected at least one network resource by at least one of the following: broadcast, and in response to a request by the device.

12. The negotiating network terminal of claim 9, wherein the negotiating network terminal is configured to perform the delivery of the at least one condition by one of the following: embedding the at least one condition in the broadcast signal, and delivering in response to a request by the device.

13. The negotiating network terminal of claim 9, wherein the negotiating network terminal is configured to receive the acknowledgement signal indicating that the device accepts the predetermined condition from at least one of the following: the device, and a third party node.

14. A non-transitory computer program product comprising program instructions which when executed by a negotiating network terminal cause the negotiating network terminal to perform the method as claimed in claim 1.

\* \* \* \* \*